United States Patent [19]

Thomas et al.

[11] Patent Number: 5,385,044
[45] Date of Patent: Jan. 31, 1995

[54] METHOD OF USING A THERMO-CHROMATIC DETERGENT LEVEL INDICATOR

[75] Inventors: John E. Thomas, River Falls, Wis.; Jody A. Toetschinger, Crystal; John E. McCall, Jr., St. Paul, both of Minn.

[73] Assignee: Ecolab Inc., St. Paul, Minn.

[21] Appl. No.: 112,579

[22] Filed: Aug. 25, 1993

[51] Int. Cl.⁶ .................................. G01F 23/22
[52] U.S. Cl. ........................... 73/295; 222/1; 222/23; 222/154; 222/185; 422/119; 422/263; 422/264; 422/266; 374/54; 116/216; 116/227
[58] Field of Search ............ 422/102, 106, 119, 263, 422/264, 266; 73/149, 295, 427, 428; 221/6, 197, 287; 436/147, 164, 165; 116/216, 227; 374/54; 206/524.6, 524.1; 222/1, 23, 36, 37, 51, 154, 185

[56] References Cited

U.S. PATENT DOCUMENTS

| | | | |
|---|---|---|---|
| 3,590,371 | 6/1971 | Shaw, Jr. | 324/51 |
| 3,696,675 | 10/1972 | Gilmour | 73/295 |
| 4,144,834 | 3/1979 | Donegan | 116/219 |
| 4,155,895 | 5/1979 | Rohowetz et al. | 260/33.4 R |
| 4,156,365 | 5/1979 | Heinmets et al. | 73/343 R |
| 4,358,955 | 11/1982 | Rait | 73/295 |
| 4,426,362 | 1/1984 | Copeland et al. | 422/263 |
| 4,538,926 | 9/1985 | Chretien | 374/150 |
| 4,569,780 | 2/1986 | Fernholz et al. | 252/90 |
| 4,569,781 | 2/1986 | Fernholz et al. | 252/92 |
| 4,687,121 | 8/1987 | Copeland | 422/264 X |
| 4,769,159 | 9/1988 | Copeland | 422/264 X |
| 4,770,859 | 9/1988 | Heiser, Jr. | 422/264 |
| 4,826,661 | 5/1989 | Copeland et al. | 422/106 |
| 4,919,983 | 4/1990 | Fremin | 428/35.7 |
| 5,086,952 | 2/1992 | Kryk | 422/264 X |
| 5,099,688 | 3/1992 | de Mars | 73/295 |

FOREIGN PATENT DOCUMENTS 1211003 9/1986 Canada .................................. 116/69

OTHER PUBLICATIONS

Coghlan, Andy "Clothes that Change Colour in the Heat of the Moment", *New Scientist*, p. 25 (1991).

Archer, K., "Thermochromic Liquid Crystal Inks and Coatings", *European Polymers Paint Colour Journal*, p. 52 (1993).

Kimmel, E., "Temperature-Sensing Materials", *Chemical Engineering*, pp. 135–138 (1983).

"Liquid Crystals-Red Hot and Blue", *The Economist*, pp. 93–94 (1991).

*Primary Examiner*—Jeffrey R. Snay
*Attorney, Agent, or Firm*—Merchant, Gould, Smith, Edell, Welter & Schmidt

[57] ABSTRACT

Disclosed is an indicator (15, 35) for determining the level of contents in an opaque, plastic container (10). The container (11) is filled with a solid chemical (11), such as a detergent. A spray of warm or hot water (19) impinges upon the eroding surface (16) of the solid chemical (11) to produce a chemical solution. The container (10) is provided with a thermo-chromatic strip (15, 35) for detecting the level of solid chemical (11) within the plastic capsule (10). A method of dispensing a solid chemical (11) and a dispensing container (10) are also disclosed.

3 Claims, 1 Drawing Sheet

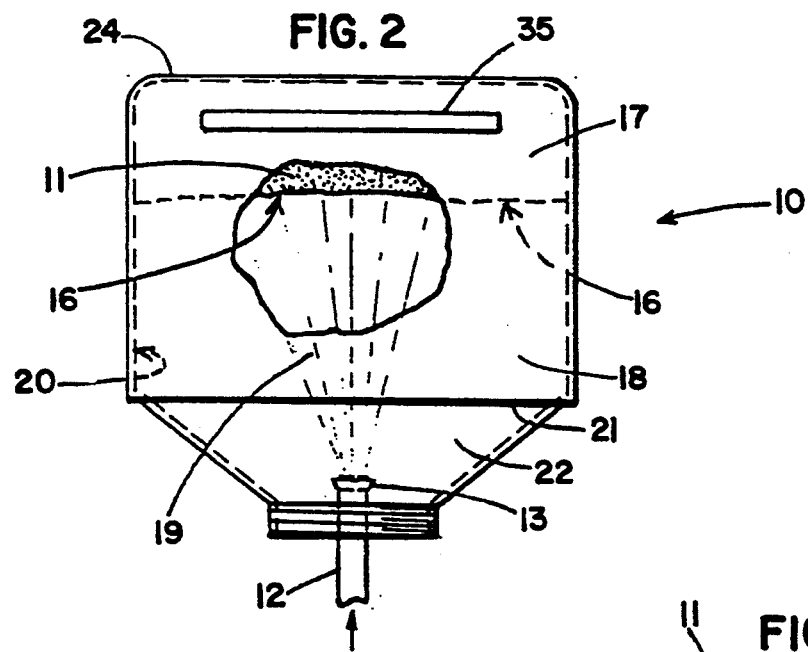
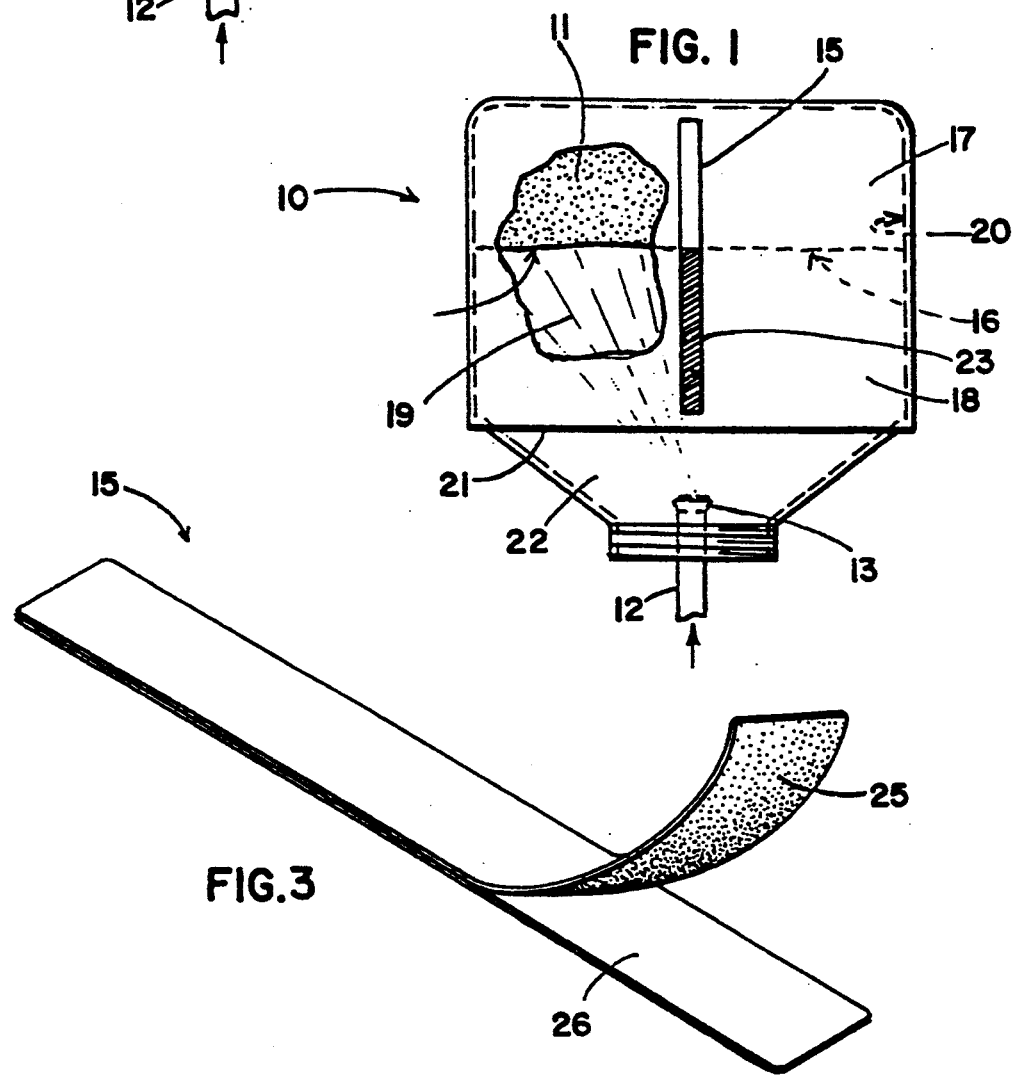

METHOD OF USING A THERMO-CHROMATIC DETERGENT LEVEL INDICATOR

FIELD OF THE INVENTION

The present invention relates generally to the determination of the level of a solid detergent product in a closed container, and more particularly to the determination of the detergent level by means of a thermo-chromatic substance.

BACKGROUND OF THE INVENTION

Solid detergents are sometimes provided in "cast" or block form, wherein the detergent is cast within a sturdy, plastic container. The container acts as a mold, a shipping and storage container, and a dispenser housing. Dispensing systems for these solids are known in the art. See, for example, U.S. Pat. No. 4,426,362, issued to Copeland et al and commonly owned U.S. Pat. Nos. 4,569,781 and 4,569,780, issued Feb. 11, 1986, to Fernholz et al. The cast detergent is dispensed by spraying a solvent onto the detergent block within the container, thereby dissolving the exposed surface of the detergent to form a concentrated working solution. The concentrated working solution falls into a reservoir or is directed by a conduit to the wash tank of a washing apparatus. When the chemical compound within the capsule is completely utilized, the exhausted capsule is simply discarded and a fully charged container placed in the dispenser. However, hazardous chemicals used in cleaning processes such as highly alkaline detergents are preferably packaged such that they can be dispensed without coming into physical contact with the human body.

A difficulty with the above type of dispenser is that there is no simple way to determine when the capsule is empty and needs to be replaced. In practice, the user must remove the plastic capsule from the dispensing apparatus and visually check the amount of detergent remaining. Alternatively, an automatic detergent sensor may be employed, such as a conductivity sensor to measure the level of detergent in the cleaning solution. However, such a system is relatively expensive, often has high maintenance requirements, and requires auxiliary equipment and electrical circuitry.

Accordingly, a need exists for a dispensing apparatus for a solid block of wash chemical, including a simple, safe, efficient and inexpensive indicator for determining the level of solid detergent remaining in the container and for determining the appropriate time for an empty container to be replaced with a full container.

SUMMARY OF THE INVENTION

The present invention is a level indicator for a capsule which contains a solid cleaning product of the type which is dissolved by impingement of a warm water spray upon the solid chemical. The capsule or container has a product-filled portion and an empty portion, the boundary of which is defined by an eroding surface of the product. The level indicator is a thermo-chromatic strip which is attached to a wall of the container, with at least a portion of the strip overlying the product-filled portion when the container is full. Preferably, the container is made of a plastic material. The thermo-chromatic substance may be either stamped upon a wall of the container, adhered by means of an adhesive, or added to the container's plastic material during the molding process.

Another aspect of the present invention is a method of dispensing a solid chemical which is positioned within an upper portion of a container, wherein the container has a thermo-chromatic strip. The steps of the inventive method include: spraying warm water within the container and onto the solid chemical; noting a color change in the thermo-chromatic strip when the container is substantially empty; and replacing an empty container with a container which is full of the solid chemical.

A primary advantage of the present invention is the ability to determine when a detergent capsule is empty. This enables the user to replace the empty product capsule with a full product capsule at the appropriate time. As a result, the concentration of the detergent solution is maintained at an adequate level. In this manner, the amount of cleaning chemical dispensed can more accurately meet the particular requirements of the situation and allow for better quality and more efficient cleaning. The invention prevents underuse of the cleaning chemical and thereby allows for sufficient cleaning product to be brought to the task.

Additionally, the invention eliminates the time-consuming and imprecise process of manually checking the product level. Furthermore, the invention requires no electronics or complex mechanical components, thereby reducing expense and maintenance requirements.

These features, along with other advantages, will become subsequently apparent, based on the details of construction and operation as more fully described hereinafter.

BRIEF DESCRIPTION OF THE DRAWINGS

Reference is made to the accompanying drawings, wherein like numerals refer to like parts throughout.

FIG. 1 is a side elevational view, partially cutaway, of a first embodiment of a container of the present invention.

FIG. 2 is a side elevational view of a second embodiment of a container of the present invention, partially cutaway.

FIG. 3 is a perspective view of a thermo-chromatic strip utilized with the present invention.

DETAILED DESCRIPTION OF THE PREFERRED EMBODIMENTS

Referring to FIGS. 1 and 2, there is shown an opaque product container or capsule 10. The capsule 10 contains a solid detergent product 11 which is preferably cast within the container 10. Alternatively, the solid product 11 may be in granular or compacted form. The solid product 11 may be a detergent, a rinse aid, a sanitizer, or any other type of suitable composition.

The container 10 has a product-filled portion 17 and an empty portion 18. Preferably, the container 10 serves as the mold and shipping container for the cast detergent 11. The capsule 10 may be made of any number of packaging materials including polymeric packaging material such as cellophanes, fluorocarbons, polyesters such as polyethylene terephthalate, as well as polyethylenes of various density, polypropylene, polyvinyl chloride, polycarbonate or nylons, polystyrenes, and mixtures thereof. The containers may be transparent, opaque or completely impervious to light.

An inlet line 12 supplies water to the capsule 10, and the water (or other solvent) is directed upwardly through a spray nozzle 13 toward the eroding surface 16 of the detergent product 11. The water spray 19 impinges upon the surface 16 of the solid chemical 11. This causes dissolution of the detergent 11, and the resulting detergent solution may be directed to a utilization point and used for dishwashing, laundry, warewashing, and other applications.

An elongated level indicator is operatively attached to the capsule 10. The level indicator is designated as 15 in FIGS. 1 and 3 and as 35 in FIG. 2. The level indicator or strip comprises a base material (such as "Mylar") which is coated or imbedded with a thermo-chromatic substance. The thermo-chromatic substance varies chromatically with variations in temperature. The base material may be coated with a suitable thermo-chromatic material by painting, stripping, screen printing, or any other suitable or desirable coating method. In the preferred embodiment, the thermo-chromatic substance is reversible. The thermo-chromatic material may be liquid crystal, mercurous oxide or any other suitable or desirable thermo-chromatic material which is responsive in an appropriate temperature range. When liquid crystal is used, it is desirable to apply a coloring substance to the surface of the base material to enhance the optical properties of the liquid crystal. Most preferably the substance is a cholesteric liquid crystal compound on a dark background. The thermo-chromatic substance can be in the form of an ink, a dye, or any other suitable type of carrier.

Exemplary thermo-chromatic materials include those available from Matsui Company as listed below in Table 1:

TABLE I

| MATSUI Type | Color Appears Below (F.°) | Color Disappears Above (F.°) |
| --- | --- | --- |
| 025 | −13.0 | 5.0 |
| 015 | 8.6 | 32.0 |
| 07 | 24.8 | 41.0 |
| 5 | 33.8 | 53.6 |
| 10 | 46.4 | 60.8 |
| 15 | 51.8 | 66.2 |
| 17 * | 57.2 | 73.4 |
| 20 * | 60.8 | 78.8 |
| 25 | 71.6 | 87.8 |
| 27 * | 75.2 | 91.4 |
| 35 * | 80.6 | 96.8 |
| 37 | 89.6 | 105.8 |
| 45 | 104.0 | 122.0 |
| 47 | 111.2 | 136.4 |

* Standard Types

In accordance with the invention, useful thermo-chromatic materials include those which have colors appearing below about 100° F. and disappearing above about 160° F. to 180° F. Such indicators are available from Matsui Company and Merck Ltd. among others.

In the preferred embodiment, the thermo-chromatic substance is an ink of the type sold by the Matsui Company of El Segundo, Calif. as Regular Type 45.

Cholesteric liquid crystal compounds exhibit vivid color changes with slight changes in the temperature which is a function of the particular compound selected. The dark background absorbs any light transmitted through the liquid crystal coating and allows the selectively reflected light determined by change in crystal orientation in response to temperature to be observed without light interference. In the presence of light, cholesterics selectively reflect one wave length of light at each angle of reflection. The pattern is reversible; the colors change and reappear as the temperature changes back and forth through a particular range. The chromatic responses occur in the mesophase between that of a crystalline solid and an isotropic or ordinary liquid. This mesophase is referred to as the mesomorphic range or the color-play region of the compound. Response time may be as low as 0.2 seconds.

One example of a compound suitable for use with the present invention is Matsui Type 45 which has a mesomorphic range of 104.0° F. to 122.0° F. Preferably, the thermo-chromatic substance has a characteristic original black color at temperatures below 122° F., but the color changes to white as it approaches 122° F., as set forth in Table I. The color changes reverse as the temperature is lowered. Specifically, the original black color reappears as the temperature is lowered to 104° F., as set forth in Table I. When the strip 15 is activated and the black color disappears, a different color than black may appear, and/or desired wording may appear, such as "Check Product Level."

The thermo-chromatic strip 15 may be positioned in a vertical orientation to extend along the height of the container, as illustrated in FIG. 1, or in a horizontal orientation, as illustrated in FIG. 2. Alternatively, the thermo-chromatic strip 15 could be of another arbitrary shape, such as a letter, according to the needs of the particular situation.

The thermo-chromatic strip 15 is heat activatable. Because the water utilized with the invention is warm or hot, the thermo-chromatic strip 15 is able to detect the temperature differential which occurs at the interface between the solid detergent 11 and the air beneath the detergent. The temperature of the container wall 20 changes abruptly at the interface between the air and the solid product 11. The interface is defined by the eroding surface 16 of the solid product 11. When the capsule 10 is full, the eroding surface 16 of the chemical is proximate the top 21 of the container's neck portion 22. In this situation, the warm water does not impinge upon the inner surface 20 of the capsule 10 where the strip 15 is located. In other words, the detergent product 11 blocks the warm water spray 19 from the inner wall 20 of the container which the thermo-chromatic strip 15 overlies. Because of this, the thermo-chromatic strip 15 does not change color when the capsule 10 is full.

The water is maintained at a temperature sufficient for activating the thermo-chromatic strip, preferably in the range of 130° F.–140° F. The water temperature should be high enough so that enough detergent product is dissolved, but it should not be so high as to melt the detergent product.

FIG. 1 illustrates that when the capsule 10 is only partially full, the warm water 19 will impinge upon a portion of the thermo-chromatic strip's underlying wall surface 20, thereby resulting in the lower shaded portion 23 of the strip 15 changing color. The change in temperature of the container's wall 20 is readily discernible visually, because of the abrupt change in color of the strip 15 at the eroding surface 16. This permits an observer to readily detect the level of the contents in the container 11.

With the embodiment illustrated in FIG. 2, the thermo-chromatic strip 35 does not change color until the detergent product 11 has been almost completely depleted. This is because the strip 35 is preferably located near the top 24 of the capsule 10. The strip 35, as shown in FIG. 2, extends horizontally and transversely along the container wall proximate the top of the container 11. Alternatively, the strip 35 could be positioned upon the top surface 24 of the container 11.

In the preferred embodiment, the thermo-chromatic substance is reversible. This allows the thermo-chromatic dye to change color every time a dispensing cycle takes place and the temperature below the detergent product 11 increases.

With the embodiment illustrated in FIG. 2, the strip changes color only when the product level is very low. This may force the user to more readily notice the low product situation, because the color of the strip 15 is not changing every time a dispensing cycle occurs.

As illustrated in FIG. 3, the thermo-chromatic strip 15 may be supplied with a pressure-sensitive adhesive 25 on its reverse side for adhering the strip 15 or 35 to the wall of the container 10. The strip 15, 35 also has a removable paper backing 26. To prevent deterioration of the thermo-chromatic strip 15, an optically transparent filter material or clear polymer coat (not shown) may be applied over the strip 15, 35 to protect it from abrasion or other physical damage.

In the preferred embodiment, the thermo-chromatic substance is applied to the capsule 10 in a screen printing operation. This step may take place at the same time a stamped identification label (not shown) on the capsule 10 is applied. With this embodiment, the pressure-sensitive adhesive is not needed.

Alternatively, the thermo-chromatic substance may be an additive to the plastic material from which the capsule 10 is formed. With this embodiment, a thermo-chromatic resin is added to the polyethylene or polypropylene prior to molding of the capsule 10. The thermo-chromatic additive is preferably a Type 45 compound sold by the Matsui Company of El Segundo, Calif. With this embodiment, the thermo-chromatic substance could be dispersed throughout the entire capsule 10. In this manner, a bottom, empty portion 18 of the container 10 would be one color, and the product filled portion 17 of the container 10 would be another color, so that the level of the detergent contents is readily discernible.

Other modifications of the invention will be apparent to those skilled in the art in light of the foregoing description. This description is intended to provide concrete examples of individual embodiments clearly disclosed in the present invention. Accordingly, the invention is not limited to these embodiments or to the use of specific elements therein. All alternative modifications and variations of the present invention which fall within the spirit and broad scope of the appended claims are covered.

What is claimed is:

1. A method of monitoring the level of a solid block of chemical which is positioned within an upper portion of an opaque container and which includes an eroding surface within said container, said container being made of a plastic material and having an internal surface and an external surface, said container including a thermo-chromatic substance, said thermo-chromatic substance being an additive to the plastic material from which said container is formed, the method comprising the steps of:
   (a) spraying warm water within said container onto said eroding surface of said solid block of chemical and onto said internal surface, said thermo-chromatic substance being selected so as to exhibit a color change of said container at the level of said eroding surface responsive to said step of spraying with warm water; and
   (b) observing said color change of said container to determine the level of said eroding surface and thereby determine when said container is substantially empty.

2. The method according to claim 1, wherein said water spray has a temperature of about 120° F. or greater.

3. The method of claim 1, wherein said thermo-chromatic substance has a temperature activity point ranging from about 100° F. to 180° F.

* * * * *